May 8, 1956 F. J. LINGEL 2,745,044

ASYMMETRICALLY CONDUCTIVE APPARATUS

Filed Sept. 15, 1951

Inventor:
Fred J. Lingel,
by Merton D. Moore
His Attorney.

United States Patent Office 2,745,044
Patented May 8, 1956

2,745,044

ASYMMETRICALLY CONDUCTIVE APPARATUS

Fred J. Lingel, Syracuse, N. Y., assignor to General Electric Company, a corporation of New York Application September 15, 1951, Serial No. 246,827

6 Claims. (Cl. 317—234)

Figures 1, 2, 3, 4, 5, 6, 7:
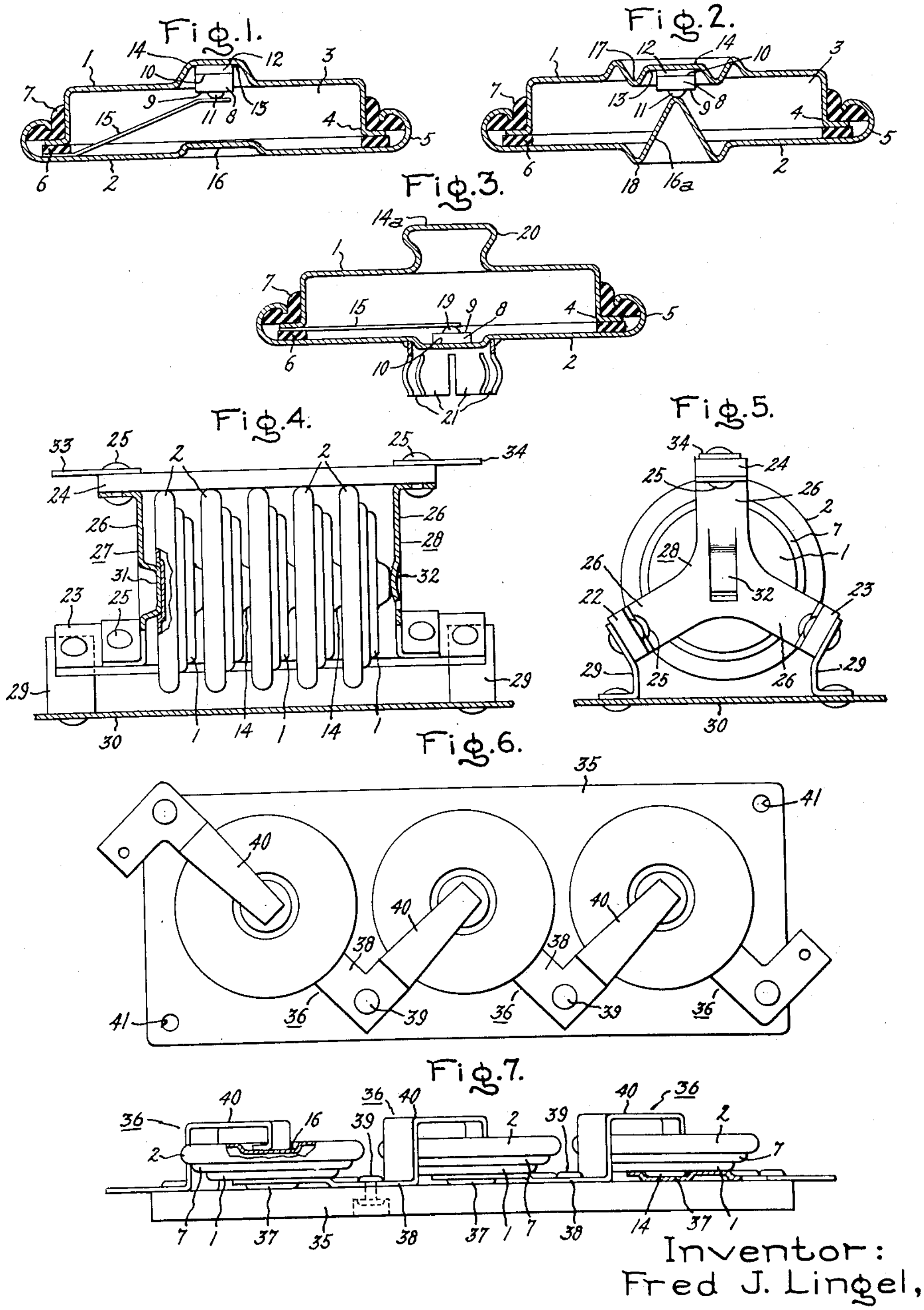

My invention relates in general to asymmetrically conductive apparatus such as rectifiers and particularly to improve rectifying elements which are well suited for use in multiple mounting arrangements. My invention is particularly applicable to asymmetrical conductive semiconductor devices of the broad area rectification barrier type.

In the copending application of Robert N. Hall, Serial No. 187,478, filed September 29, 1950, and assigned to the assignee of the present application, there is described and claimed an improved semiconductor rectifier of the broad area type and an improved method of controllably producing the rectification barrier or P–N junction. The present invention relates particularly to an improved rectifier element which provides a housing for rectifying wafers of the type described in the Hall application, protects the wafers from atmospheric contaminants which deleteriously affect the rectification properties thereof, provides for the dissipation of heat generated in the rectifying wafers and facilitates multiple mounting of the rectifying elements to satisfy different electrical requirements with a minimum number of more or less standard rectifying elements.

As will be readily appreciated by those skilled in the art, various electrical properties of the rectifying elements are subject to control and in many cases one property is dependent upon another so that, for example, resistance, current carrying capacity, ability to withstand inverse voltage and the like must be balanced one against the other. Accordingly, it is desirable to be able to mount a plurality of individual units having desirable characteristics of one type in multiple assemblies in order to obtain the over-all current carrying and voltage withstanding properties desired.

In the dry rectifier art, such as the selenium or copper oxide rectifier art, it is common practice to mount a plurality of rectifying units in a multiple mounting arrangement. One of the common types of mounting includes a stack of rectifying disks or washers which are apertured to receive a retaining bolt. The rectifying disks are assembled on the retaining bolt with a suitable contact washer interposed between successive rectifying disks.

The present invention contemplates an improved rectifier element which is sealed, self contained and complete in itself, apart from any of the mounting elements employed for multiple mounting. The element is therefore well suited for use either as a single element or as one element of a multiple mounting.

Accordingly, the objects of my invention include the provision of an improved asymmetrically conductive element which mounts and encloses an asymmetrically conductive semiconductor wafer of the type described, provides individual terminals therefor, affords protection thereof from mechanical and moisture damage, and cools the semiconductor piece by heat transfer therefrom during operation.

It is a further object of my invention to provide a new and improved sealed contact rectifier element in the form of a sealed unit, complete in itself and suited to either individual or multiple mounting.

It is still another object of my invention to provide an asymmetrically conductive unit including a plurality of series connected semiconductor elements wherein any one of the semiconductor elements may be easily individually removed and replaced.

In carrying out my invention in one form thereof, I provide an asymmetrically conductive unit which comprises a plurality of asymmetrically conductive elements, each including a first and a second plate member secured together in insulated and sealed relation and defining a sealed cavity therebetween. A semiconductor piece having a P–N junction therein between two surface portions thereof is conductively secured from one of the surface portions to the first plate member within the sealed cavity, and means are provided for conductively connecting the other of the two surface portions to the second plate member. Each of the asymmetrically conductive elements, therefore, has a P–N junction semiconductor piece mounted within a sealed cavity defined by the first and second plate members, so that it is protected from mechanical and moisture damage. The two plate members themselves serve as individual terminals for the semiconductor piece they enclose, and further serve as means for conducting heat away from the semiconductor piece during operation. The asymmetrically conductive unit further includes means for mounting the plurality of asymmetrically conductive elements in mutually insulated relation and means for connecting the elements in series circuit relation from the first plate member of one element to the second plate member of the next adjacent element. The mounting and connecting means are so arranged that it is but a simple matter to remove any one of the elements from the unit and replace it with another element. The entire unit thus comprises a series-connected plurality of semiconductor P–N junction devices which afford high quality rectification under relatively great inverse voltages, at the same time making possible the protection and cooling of the semiconductor pieces and their easy individual replacement.

The novel features of my invention are pointed out with particularity in the appended claims. However, for a better understanding of the invention, together with further objects and advantages thereof, reference should be had to the following description taken in conjunction with the accompanying drawing, wherein:

Fig. 1 is an elevational view, in section, of an asymmetrically conductive element constructed in accordance with my invention; Fig. 2 is an elevational view, in section, of a modification of the element shown by Fig. 1; Fig. 3 is an elevational view, in section, of another modification of the element shown by Fig. 1; Fig. 4 is an elevational view, partially broken away, of a first embodiment of an asymmetrically conductive unit constructed in accordance with my invention; Fig. 5 is a side elevation of the unit shown by Fig. 4; Fig. 6 is a plan view of another embodiment of an asymmetrically conductive unit illustrating my invention; and Fig. 7 is an elevational view of the unit shown by Fig. 6.

Referring now to Fig. 1, the asymmetrically conductive element there illustrated comprises a first terminal plate member 1 and a second terminal plate member 2, secured together in sealed and insulated relation to define a sealed cavity 3 therebetween. Preferably members 1 and 2 are substantially the same size and shape, thus having registering edge portions 4 and 5, respectively, at which the securing seal is made. One or both of members 1 and 2 may be dished in shape to define the cavity 3, e. g., formed with concave surface or, as illustrated in the preferred arrangement, formed with depending side portions 4 and 5. Means for sealing and securing the members 1 and 2 together in insulated relation may comprise a first washer 6 of insulating material, such as varnished cambric, interposed between the edge portions 4 and 5, and a second washer 7 of resilient insulating material, such as butyl rubber, overlying one of the edge portions with the remaining edge portion bent around and crimped into the second washer 7. As shown in the drawing, second washer 7 overlies edge portion 4 and the lower edge portion 5 is bent up, around, and crimped into washer 7.

Within cavity 3, there is mounted a semi-conductor piece 8 which, in accordance with the copending Hall application, supra, is an individual asymmetrically conductive device. The semiconductor piece 8 has a P–N junction or rectification barrier therein intermediate two surface portions 9 and 10. The area of the P–N junction is relatively broad but preferably in the order of 0.01 square inch so that back resistance is high and there is little likelihood of flaws. Preferably, the surface portions 9 and 10 are on opposite faces of the semiconductor piece 8, as shown, although it is possible for them to be on adjacent faces or on the same face.

As stated previously, the P–N junction may be created by placing a deposit of an acceptor impurity, such as indium or aluminum, on one surface portion of a piece of semiconductor material, such as germanium or silicon, and a deposit of a donor impurity, such as antimony or phosphorous, on another surface portion of the semiconductor piece, whereby the diffusions of the impurities into the semiconductor produce N-type and P-type induction-characterized portions respectively in the semiconductor with a P–N junction therebetween. While it is possible then to remove the impurity deposits and make connections directly, as by soldering, to these surface portions, it is expedient to leave them secured as integral parts of the semiconductor piece, and to make connections to the surface portions through the impurity deposits, since the deposits are bonded to the semiconductor portion during the diffusion process and since the deposits have no adverse effects on the device during operation. Accordingly, I have represented a deposit 11 of an acceptor impurity and a deposit 12 of a donor impurity as integral parts of semiconductor piece 8, although it will be understood that one or both impurities could be removed after the P–N junction is formed.

Further, since a P–N junction may be successfully created by starting with a piece of N-type semiconductor material and diffusing only an acceptor impurity thereinto, or by starting with a piece of P-type semiconductor material and diffusing only a donor impurity thereinto, the second impurity deposit is not required and may be omitted, the one required impurity deposit being removed or left to remain, as desired, after the P–N junction is formed.

The semiconductor piece 8 is conductively secured from the surface portion 10 thereof to the plate member 1 within cavity 3, as by soldering or the like, and in the illustrated arrangement, the impurity deposit 12 may serve as the bonding agent. Member 1 may include a cup-like portion 13 in which semiconductor piece 8 is conveniently located for mounting, as shown, the cup-like portion also providing an external projection 14 from member 1, which may be advantageously employed in mounting as will be presently explained in detail.

Member 1 is preferably made of a metal which suitably matches the thermal expansion characteristics of semiconductor piece 8 and which at the same time is a good conductor of heat, so that the bond between member 1 and piece 8 remains secure under elevated temperatures and heat is conducted away from piece 8 to cool it during operation. For example, if semiconductor piece 8 is made of germanium, fernico is an exemplary metal satisfactory in this respect.

Means for conductively connecting the other surface portion, i. e., portion 9, to plate member 2 may be provided in the form of a strip conductor 15 which is clamped at one end thereof between edge portion 5 and washer 6, and which engages surface 9 directly, or surface 9 through impurity deposit 11, at the other end thereof. Conductor 15 may be a suitable length of wire which is bonded to surface portion 9, conveniently in the illustrated arrangement by impurity deposit 11, or may be a ribbon of resilient, spring-like material which bears with satisfactory contact pressure against surface 9 or impurity deposit 11. Preferably conductor 15 is of a material and dimensions so as to be a good conductor of heat, whereby heat is conducted from semiconductor piece 8 to plate member 2 and thence radiated by member 2 to cool piece 8 during the operation of the element.

As stated previously, plate member 1 includes an external projection such as projection 14, and further, plate member 2 includes an external depression 16, defined therein to register and cooperate in interfitting engagement with a projection 14 on the plate member 1 of a second similar element. A plurality of the asymmetrically conductive elements may thus be stacked axially, the projection 14 of one element fitting into the depression 16 of the next adjacent element to provide a good, broad area contact therebetween and, at the same time, locating the elements in an axially transverse direction with respect to one another.

The asymmetrically conductive element shown by Fig. 1 thus provides a sealed housing, formed by the plate members 1 and 2, for the semiconductor piece 8 which excludes moisture, acid fumes or other damaging atmospheres from the semiconductor piece 8 and also prevents mechanical damage thereto. The members 1 and 2 also provide individual electrical terminals for the semiconductor piece 8, and thermally conductive and radiating means for cooling piece 8 during operation, even though it is thus enclosed. Heat is transferred directly from semiconductor piece 8 to plate member 1 and thence radiated, while heat is conducted from semiconductor piece 8 to plate member 2 through conductor 15 so that the two broad radiating surfaces of the plate members are employed to produce efficient cooling.

A plurality of the elements may be conveniently stacked axially with the plate members thereof in good electrical contact to form a circuit combination of the elements which for the particular construction described here will be a series circuit.

The modification of the asymmetrically conductive element shown by Fig. 2 is similar to that shown by and described in conjunction with Fig. 1 and like numerals are used to designate like parts. However, in the modification of Fig. 2 the strip conductor 15 is eliminated and means for conductively connecting surface portion 9 of semiconductor piece 8 to member 2 are provided by a more pronounced depression 16*a* defined in member 2 by which member 2 extends across cavity 3 to conductively engage surface 9, or as shown, to conductively engage surface 9 through impurity 11. Member 2 may be bonded to surface 9, as by a fused solder or impurity deposit 11, or may simply bear on surface 9 with sufficient pressure to make good electrical contact. The external surfaces of plate members 1 and 2 are modified further to define an annular depression 17 and an annular projection 18 respectively as shown. These depressions 17 and projections 18 are of such size and are so located that a plurality of the elements illustrated in Fig. 2 may be stacked axially together with the projections 14 of each element fitting into the depression 16*a* of the next adjacent element, and with the projections 18 of one element fitting with the depression 17 of an adjacent element. This arrangement produces good electrical contact at the engaging surfaces and positive location of the elements in an axially transverse direction with respect to one another.

Turning next to Fig. 3, the modified asymmetrically conductive element illustrated thereby is similar to that shown by and described in conjunction with Fig. 1. However, in this modification the semiconductor piece 8 is illustrated as conductively secured, as by solder, not shown, to the terminal plate member 2 and the strip conductor 15 is clamped at one end thereof between the edge portion 4 of member 1 and washer 6 to provide electrical connection between surface 9 and member 1. This arrangement thus mounts semiconductor piece 8 on plate member 2 which, as shown, has the larger surface area of the two plate members and may therefore provide more effective heat transfer, by direct conduction and radiation, away from piece 8 to cool same during operation.

An appreciable cooling action is also produced by heat conducted to plate member 1 through conductor 15. As illustrated by Fig. 3, no impurity deposit is present on semiconductor piece 8. However, conductor 15 is connected to surface 9 by a quantity of P-type impurity solder 19, such as indium solder.

A further important difference in the modified element of Fig. 3 is that an external, projection **14*a* from member 1 is formed, for example, with a flared portion 20, to cooperate with socket means of annular element. Socket means, including a plurality of formed spring tabs 21, extend externally from member 2 in a peripherally closed array. Thus, a plurality of the elements shown by Fig. 3 may be supported and connected in axial and series relation simply by snapping the projection 14*a* of one element into the socket means provided by the array of tabs 21 on the next adjacent element. This provides a tight, broad area contact connecting the elements in series relation with like polarity with each element holding the adjacent element not only posiitoned in an axially transverse direction, but also in an axial direction. The snap action afforded by the socket means and the cooperating projection 14*a*** allows a plurality of the elements to be quickly assembled together in series combination and one element to be easily and quickly substituted for another in such a snapped-together combination.

Turning now to Figs. 4 and 5, these figures illustrate an asymmetrically conductive unit, which includes a plurality of the asymmetrically conductive elements described hereinbefore, for example, that form illustrated by Fig. 1. This embodiment of the asymmetrically conductive unit of my invention comprises a plurality of asymmetrically conductive elements stacked axially as shown with the plate member 1 of each element electrically contacting and bearing against the plate member 2 of the next adjacent element. The semiconductor pieces 8 are thus connected in series relation with like polarity with respect to the P–N junctions therein. The unit further comprises means for mounting the elements in otherwise mutually insulated relation, such as three insulator members or bars 22, 23 and 24, which are disposed around the peripheries of the elements, bearing thereon at three circumferentially spaced points. This arrangement is best depicted in Fig. 5. The insulator bars 22—24 are held in this spaced relation by fasteners 25 securing them to spaced arms 26 extending from end plates 27 and 28 at each end of the stack. The lower two insulator bars 22 and 23, as illustrated in Fig. 5, may extend beyond end plates 27 and 28 as shown and thus have feet members 29 secured thereto, in insulated relation to the other parts, by which the entire unit may be mounted on a chassis, panel 30, or the like. Means for connecting the elements in series relation from member 1 of one element to member 2 of the next adjacent element are provided by the end plates 27 and 28, which are carried by insulator bars 22 and 23.

End plate 27 is provided with a projection 31 which makes contact with the plate member 2 of the end element on the left in the drawing by fitting into the depression 16 defined by that plate member 2; and a resilient tab 32 is provided on plate 28 which contacts the plate member 1 of the end element on the right in the drawing by bearing with spring pressure against projection 14 on that plate member 1. The spring biasing force exerted by tab 32 thus makes the plurality of elements bear against one another in the axially stacked arrangement shown, and insures a low resistance contact between the elements in series relation. Terminal connections 33 and 34 for the entire unit may be secured by the fasteners 25 which also secure insulator bar 24 to arms 26, as shown.

It will be apparent from the foregoing that this asymmetrically conductive unit affords high quality rectification, accommodating high inverse voltages, because a plurality of the P–N junction semiconductor pieces are serially connected with like polarity. As stated previously, each semiconductor piece is protected from moisture and mechanical damage, and cooled during operation by the element of which it is a part. Further, any one of the elements in the unit may be easily replaced simply by removing the top insulator bar 24, slipping out one element, and sliding another into its place. The structure shown not only is electrically advantageous and structurally strong, but also is simple in nature and economical in cost.

Referring next to Figs. 6 and 7, I have shown a second embodiment of the asymmetrically conductive unit of my invention which is particularly adapted to be mounted on or in electrical apparatus with small space requirement, since it is in shape generally thin and flat. A plurality of the asymmetrically conductive elements are spaced in coplanar relation on one side of a sheet 35 of insulating material. A plurality of connecting strip members 36, preferably resilient, provide means for securing the elements in spaced relation on sheet 35 and also means for connecting the elements in electrical series relation from the plate member 1 of one element to the plate member 2 of another element. As shown, the strap members 36 each include a receptacle portion 37 which lies upon sheet 35 and receives the external projection 14 on the plate member 1 of one of the elements; include a flat portion 38 secured to sheet 35 by a fastener 39, which is preferably countersunk on the reverse side of sheet 35 in order that sheet 35 may rest on a metal surface without shorting out the elements; and include an arm portion 40 which is turned up, over, and down to engage the depression 16 in the plate member 2 of another one of the elements. The arm portion 40 may exert a spring force downwardly on the element it engages, thus firmly securing the element in position and assuring a good electrical contact between itself and the plate member 1 it bears upon, and between the plate member 2 of the same element and the receptacle portion 37 in which its projection 14 resides. It will be seen, therefore, that the strap members 36 both secure the elements in place and connect them in series relation with like polarity from the plate member 1 of one element to the plate member 2 of another element. Further, by making arm portion 40 resilient, each individual element may be easily removed and replaced simply by temporarily deflecting the arm portion 40 associated therewith upward and slipping the element into or out of position. The end strap members 36 may be cut off and conveniently utilized as terminal connections for the unit; and the entire unit may be mounted on a chassis or the like by fasteners engaging insulator sheet 35 at mounting holes 41 defined therein.

While the present invention has been described by reference to particular embodiments thereof, it will be understood that numerous modifications may be made by those skilled in the art without actually departing from the invention. I, therefore, aim in the appended claims to cover all such variations as come within the true spirit and scope of my invention.

What I claim as new and desire to secure by Letters Patent of the United States is:

1. An asymmetrically conductive unit comprising in combination a sheet of insulating material; a plurality of asymmetrically conductive elements each including a first and a second terminal plate member fastened in sealed and insulated relation and defining a sealed cavity therebetween, a semiconductor piece having a P–N junction therein between two surface portions thereof, said semiconductor piece being conductively secured from one of said surface portions to one of said plate members within said cavity, and means conductively connecting the other of said surface portions to the other of said plate members; and a plurality of formed connecting strip members; said elements being secured in coplanar spaced relation by said strip members on one face of said sheet and electrically connected from the said first plate member of one of said elements to the said second plate member of another of said elements by said strip members.

2. An asymmetrically conductive element comprising a first and a second dished terminal plate member, means for providing an insulating seal between said first and second plate members at the edge portions thereof with said dished plate members facing each other to define a sealed cavity, a semiconductor piece having a broad area P–N junction therein between two surfaces thereof, said semiconductor piece being conductively secured to said first plate member within said cavity at one of said two surfaces, and a projecting metallic member conductively connecting the other of said semiconductor piece surfaces to said second plate member.

3. An asymmetrically conductive element comprising first and second terminal plate members having registering edge portions and defining a cavity therebetween, a first washer of insulating material interposed between the edge portions of said members, a second washer of resilient insulating material overlying one of said edge portions, the other of said portions being crimped into said second washer to secure said members together in sealed and insulated relation, a semiconductor piece having a P–N junction therein between two surfaces thereof, said semiconductor piece being secured from a first of said two surfaces to said first plate member within said cavity, and a conductive strip clamped at one end thereof between the edge portion of said second plate member and said first washer and extending to conductively engage the other of said two semiconductor piece surfaces.

4. An asymmetrically conductive element comprising a first terminal plate member, a semiconductor piece having a rectification barrier between two surface portions thereof, said semiconductor piece being conductively secured at one of said two surface portions to said first plate member, a second terminal plate member secured in sealed and insulated relation to said first plate member along a boundary surrounding said semiconductor piece with said semiconductor piece located in a sealed cavity defined by said first and second plate members, and means conductively connecting said second plate member to the other of said two surface portions of said semiconductor piece, said conductively connecting means comprising a projection from said second plate member extending across said cavity to engage the other of said two surface portions of said semiconductor piece.

5. An asymmetrically conductive element comprising a first terminal plate member, a semiconductor piece having a rectification barrier between two surface portions thereof, said semiconductor piece being conductively secured at one of said two surface portions to said first plate member, a second terminal plate member secured in sealed and insulated relation to said first plate member along a boundary surrounding said semiconductor piece with said semiconductor piece located in a sealed cavity defined by said first and second plate members, and means electrically and thermally conductively connecting said second plate member to the other of said two surface portions of said semiconductor piece, one of said first and second plate members including an external projection therefrom and the other of said members having defined in the external surface thereof a depression formed to cooperate with interfitting engagement with the projection on one plate member of a similarly formed element, whereby a plurality of said elements may be stacked with projection from the said one plate member of one element engaging the depression of the other plate member of the next adjacent element to connect a plurality of elements in series relation.

6. An asymmetrically conductive element comprising a first terminal plate member, a semiconductor piece having a rectifier barrier between two surface portions thereof, said semiconductor piece being conductively secured at one of said two surface portions to said first plate member, a second terminal plate member secured in sealed and insulated relation to said first plate member along a boundary surrounding said semiconductor piece with said semiconductor piece located in a sealed cavity defined by said first and second plate members, and means electrically and thermally conductively connecting said second plate member to the other of said two surface portions of said semiconductor piece, one of said first and second plate members including an external projection therefrom and the other of said plate members including socket means on the external surface thereof for receiving with interfitting engagement the projection on one plate member of a similarly formed element, whereby a plurality of said elements may be stacked with the projection from said one of said first and second plate members of one element received in mechanical and electrical connection by the socket means of the said other of said first and second plate members of the next adjacent element to connect and mount said plurality of elements in series relation.

References Cited in the file of this patent

UNITED STATES PATENTS

| | | |
|---|---|---|
| 1,182,202 | Parker | May 9, 1916 |
| 1,671,247 | Levy | May 29, 1928 |
| 1,678,826 | Ruben | July 31, 1928 |
| 1,872,304 | Kraut et al. | Aug. 16, 1932 |
| 1,908,800 | Utne | May 16, 1933 |
| 2,156,054 | Geisler et al. | Apr. 25, 1939 |
| 2,261,618 | Esseling et al. | Nov. 4, 1941 |
| 2,282,344 | Ruben | May 12, 1942 |
| 2,314,104 | Richards et al. | Mar. 16, 1943 |
| 2,343,379 | Kotterman | Mar. 7, 1944 |
| 2,345,038 | De Lange et al. | Mar. 28, 1944 |
| 2,445,805 | Skinker | July 27, 1948 |
| 2,485,593 | Haigh | Oct. 25, 1949 |
| 2,536,698 | Ruben | Jan. 2, 1951 |
| 2,545,863 | Sell et al. | Mar. 20, 1951 |
| 2,588,806 | Cubitt et al. | Mar. 11, 1952 |
| 2,617,863 | Stinson | Nov. 11, 1952 |
| 2,632,781 | Woodring | Mar. 24, 1953 |